United States Patent
Gondo

[11] Patent Number: 6,027,161
[45] Date of Patent: Feb. 22, 2000

[54] PASSENGER PROTECTING STRUCTURE OF VEHICLE BODY UPPER PORTION OF AUTOMOBILE

[75] Inventor: Kenji Gondo, Toyota, Japan

[73] Assignee: Toyota Jidosha Kabushiki Kaisha, Toyota, Japan

[21] Appl. No.: 08/781,819

[22] Filed: Jan. 10, 1997

[30] Foreign Application Priority Data

Jan. 11, 1996 [JP] Japan .................................. 8-019241

[51] Int. Cl.[7] .............................................. B62D 25/06
[52] U.S. Cl. ........................................ 296/214; 296/210
[58] Field of Search .................................. 296/188, 189, 296/210, 214; 280/751

[56] References Cited

U.S. PATENT DOCUMENTS

| | | |
|---|---|---|
| 3,779,595 | 12/1973 | Suzuki et al. . |
| 4,020,207 | 4/1977 | Alfter et al. ......................... 296/214 X |
| 4,043,589 | 8/1977 | Alfter et al. ............................. 296/214 |
| 4,070,055 | 1/1978 | Fleisch ..................................... 296/214 |
| 4,243,261 | 1/1981 | Trenkler ............................. 296/210 X |
| 4,275,919 | 6/1981 | Okamoto et al. ....................... 296/214 |
| 4,406,494 | 9/1983 | Uemura et al. ......................... 296/214 |
| 4,475,765 | 10/1984 | Vogt et al. .............................. 296/210 |
| 5,163,730 | 11/1992 | Welch . |
| 5,318,338 | 6/1994 | Ikeda ....................................... 296/210 |
| 5,333,554 | 8/1994 | Yamada et al. .................... 296/210 X |
| 5,823,611 | 10/1998 | Daniel et al. ........................... 296/214 |

FOREIGN PATENT DOCUMENTS

| | | |
|---|---|---|
| 6-211161 | 8/1994 | Japan . |
| 7-47896 | 2/1995 | Japan . |
| 7-187008 | 7/1995 | Japan . |
| 7-205660 | 8/1995 | Japan . |
| 7-246953 | 9/1995 | Japan . |
| 7-285394 | 10/1995 | Japan . |

*Primary Examiner*—D. Glenn Dayoan
*Attorney, Agent, or Firm*—Pillsbury Madison & Sutro LLP

[57] ABSTRACT

A structure for protecting a passenger of a vehicle body upper portion of an automobile having a roof side rail (20) disposed inwardly of a roof panel (38) and extending in the longitudinal direction of the vehicle body, and an interior trim material (30) disposed inwardly of the roofside rail is described. The protecting structure includes an energy absorbing material (50) in a space (48) between the interior trim material (30) and the roof panel (38) along the roofside rail (20).

30 Claims, 3 Drawing Sheets

PASSENGER PROTECTING STRUCTURE OF VEHICLE BODY UPPER PORTION OF AUTOMOBILE

BACKGROUND OF THE INVENTION

1. Field of the Invention

The present invention relates to a passenger protecting structure of a vehicle body upper portion of an automobile, and more particularly, to a structure for protecting a passenger by a vehicle body upper portion having a structural member such as a roofside rail or a header.

2. Description of the Related Art

There is proposed a structure for protecting a passenger by a vehicle body upper portion of an automobile including a roofside rail which is a structural member extending in the forward and backward direction or longitudinal direction of the vehicle body, with an intention to reduce the amount of displacement and a peak load for energy absorption (Japanese Patent Appln. Public Disclosure No. 7-246953). In this protecting structure, the roofside rail includes an outer panel, an inner panel disposed with a space from the outer panel in the inward direction of a passenger compartment, i.e., inwardly of the outer panel and an energy absorbing panel having a smaller thickness than that of the outer panel and that of the inner panel and disposed with a space from the inner panel inwardly thereof, the flanges respectively of the outer panel, the inner panel and the energy absorbing panel being overlapped and joined such that a section cut at a vertical imaginary plane presents a closed structure.

SUMMARY OF THE INVENTION

In the protecting structure relative to the foregoing proposal, when a load applied by a passenger is directed toward the roofside rail, an energy absorption can be attained by deforming the energy absorbing panel by the load. However, since the load is not always directed toward the roofside rail, it is preferable to attain energy absorption in the neighborhood of the roofside rail as well. The same applies to a header which is a structural member extending in the width direction, i.e., the lateral direction of the vehicle body.

The present invention provides a passenger protecting structure of a vehicle body upper portion of an automobile which can absorb energy in the neighborhood of a structural member.

The present invention concerns a structure for protecting a passenger by a vehicle body upper portion of an automobile including a structural member disposed inwardly of a roof panel and extending in the longitudinal or lateral direction of the vehicle body and an interior trim material disposed inwardly of the structural member. This protecting structure includes an energy absorbing material disposed along the structural member in a space between the interior trim material and the roof panel.

The structural member of a vehicle body is a roofside rail extending in the longitudinal direction of the vehicle body upper portion or a header extending in the lateral direction of the vehicle body upper portion. The energy absorbing material is preferably disposed in the space positioned above the structural member along the structural member. The energy absorbing material is formed by bending a metal plate into a so-called hat-like shape, or can be hard urethane foam or a lattice made of aluminium or resin.

The structural member may have energy absorbing means made of a metal panel. In that case, the energy absorbing material may be made of a metal plate. Being disposed in the space between the interior trim material and the roof panel, the energy absorbing material itself is deformed, and the roof panel is also deformed, if a predetermined or greater load is applied mainly from the head of a passenger. So, with a deformation of the roof panel taken into account, according to characteristics in requirement of each car, the thickness of the metal plate as an energy absorbing material is, for example, experimentally determined. In general, the thickness of the metal plate can be determined to be 0.8 to 0.4 mm. In case the energy absorbing material is a metal plate and the structural member is the roofside rail, the energy absorbing material is formed into a hat-like shape integrally having a pair of flange portions spaced apart in the lateral direction of the vehicle body at a cross section cut at a vertical imaginary plane orthogonal to the center line in the longitudinal direction of the vehicle body, and a space forming portion rising from the flange portions inwardly or outwardly thereof. On the other hand, in case the structural member is the header, the energy absorbing material is formed into a hat-like shape integrally having a pair of flange portions spaced apart in the longitudinal direction of the vehicle body at a cross section cut at a vertical imaginary plane including the center line, and a space forming portion rising from the flange portions inwardly or outwardly thereof. If the space forming portion rises from the pair of flange portions inwardly thereof, the flange portions may be welded or adhered to the roof panel. On the other hand, if the space forming portion rises from the pair of flange portions outwardly thereof, the flange portions may be adhered to the interior trim material. In case the structural member includes the energy absorbing means made of a metal panel, the shape and the thickness of the metal panel may have substantially the similar shape and the same thickness as the metal panel of the energy absorbing material.

When a predetermined or greater load is applied to a position where the energy absorbing material is disposed off the structural member from mainly the head of the passenger, the energy absorbing material is deformed to absorb an impact energy due to the load.

A structural member of a vehicle body is subjected to restrictions in dimension, shape, quality of material or the like according to the type of an automobile. In the present invention, however, the energy absorbing material, if it can be disposed in the space between the interior trim material and the roof panel along the structural member, can be of any dimension and shape, and the quality of the material can be selected with an energy absorption taken as the principal object. Since the working of the structure for protecting a passenger can be done at such a high degree of freedom, an effective energy absorption can be expected even if a narrow space is utilized.

In case the structural member has a metal energy absorbing panel, by forming the energy absorbing material having a pair of flange portions and a space forming portion with a metal plate into a hat-like shape, which results in broadening an energy absorbing zone which has few uncrushed portions and an energy absorbing characteristic with a small amount of displacement and a peak load. As a result, more protection of a passenger can be attained. Further, by an embodiment of fixing a pair of flange portions on a roof panel, the rigidity of the roof panel can be enhanced by the energy absorbing material.

DESCRIPTION OF THE PREFERRED EMBODIMENTS

Figure 1:
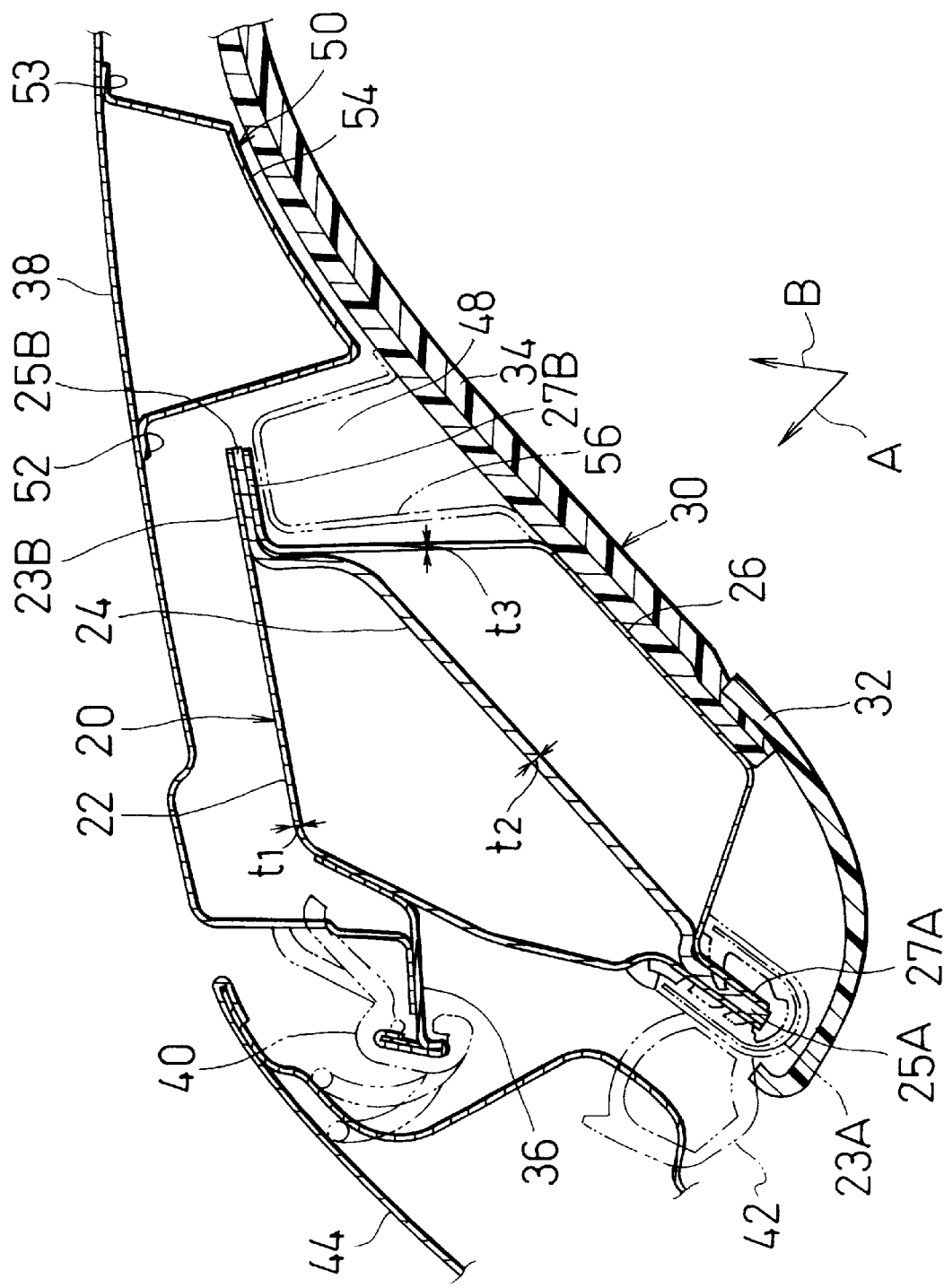
FIG. 1 is a sectional view of an embodiment of the passenger protecting structure of a vehicle body upper portion of an automobile relative to the present invention, cut at a vertical imaginary plane orthogonal to the center line in the longitudinal direction of the vehicle body.

A passenger protecting structure aims, as shown in FIG. 1, to protect a passenger by a vehicle body tipper portion of an automobile having a structural member 20. The structural member 20, in the illustrated embodiment, is a roofside rail. The roofside rail 20 includes an outer panel 22, an inner panel 24 disposed with a space from the outer panel 22 inwardly thereof, and an energy absorbing panel 26 having a thickness $t_3$ smaller than the thickness $t_1$ of the outer panel 22 and the thickness $t_2$ of the inner panel 24 and disposed with a space from the inner panel 22 inwardly thereof. The confronting ones of flanges 23A, 23B of the outer panel 22 and flanges 25A, 25B of the inner panel 24 and flanges 27A, 27B of the energy absorbing panel 26 are overlapped to one another and spot-welded, and the roofside rail 20 is formed such that a section cut at a vertical imaginary plane presents a closed structure. The space between the inner panel 24 and the energy absorbing panel 26 is required for energy absorption, and can be set at, for example, 10 to 30 mm. The thickness $t_3$ of the energy absorbing panel 26 is 0.6 mm.

An interior trim material 30 is disposed inwardly of the roofside rail 20. In the illustrated embodiment, the interior trim material 30 is composed of a roofside garnish 32 and a roof liner 34. A drip channel 36 is welded to the roofside rail 20, while a roof panel 38 is welded to the drip channel 36. A weather strip 40 is mounted on the drip channel 36, and further, an opening trim 42 is mounted on the flange joint portion of the roofside rail 20, and a door 44 is pressed to them.

A space 48 is formed between the interior trim material 30 and the roof panel 38 as a result of disposing the interior trim material 30, and an energy absorbing material 50 is disposed in the space 48 along the roofside rail 20 to extend in the longitudinal direction of the vehicle body. The energy absorbing material 50 is not required to extend over the whole length of the roofside rail 20, and it is sufficient to extend within a range where the head of a passenger is likely to collide. In the illustrated embodiment, the energy absorbing material 50 is made of a steel plate having the same thickness as that of the energy absorbing panel 26. The energy absorbing material 50 has integrally a pair of flange portions 52, 53 with a space in the lateral direction of the vehicle body at a section cut at a vertical imaginary plane, i.e., a plane parallel to the surface of the drawing, and a space forming portion 54 rising from these flange portions 52, 53 inwardly thereof, and is formed into a hat-like shape. The pair of flange portions 52, 53 are spot-welded to the roof panel 38.

When a predetermined or more load is applied from the head of a passenger in the direction of A, the roof liner 34 is deformed, and following this deformation, the energy absorbing panel 26 is deformed toward the inner panel 24. However, even if a predetermined or more load is applied in the direction of B, the energy absorbing panel 26 is deformed little. Consequently, if only the energy absorbing panel 26 is provided, energy absorption will be minimal depending on the direction of the load. By extending the energy absorbing panel 26 to the neighborhood of the roof panel 38, the load in the direction of B may be addressed, but it is not possible to do so by a constraint of the roofside rail 20. According to the present invention, since the energy absorbing material 50 is disposed within the space 48 between the interior trim material 30 and the roof panel 38, the energy based on the load can be absorbed by buckling deformation mainly of rising portions of the space forming portion 54 of the energy absorbing material 50 when the load is applied in the direction of B.

Since the flange joint portion of the roofside rail 20 is provided between the energy absorbing panel 26 and the energy absorbing material 50, the shape and the position of the energy absorbing material 50 are restricted as shown in the drawing. In this case, another energy absorbing material 56 can be disposed between the energy absorbing panel 26 and the energy absorbing material 50 so as to oppose the flange joint portion. The energy absorbing material 56 can be mounted on the interior trim material in the same state as shown in FIG. 2.

Figure 3:
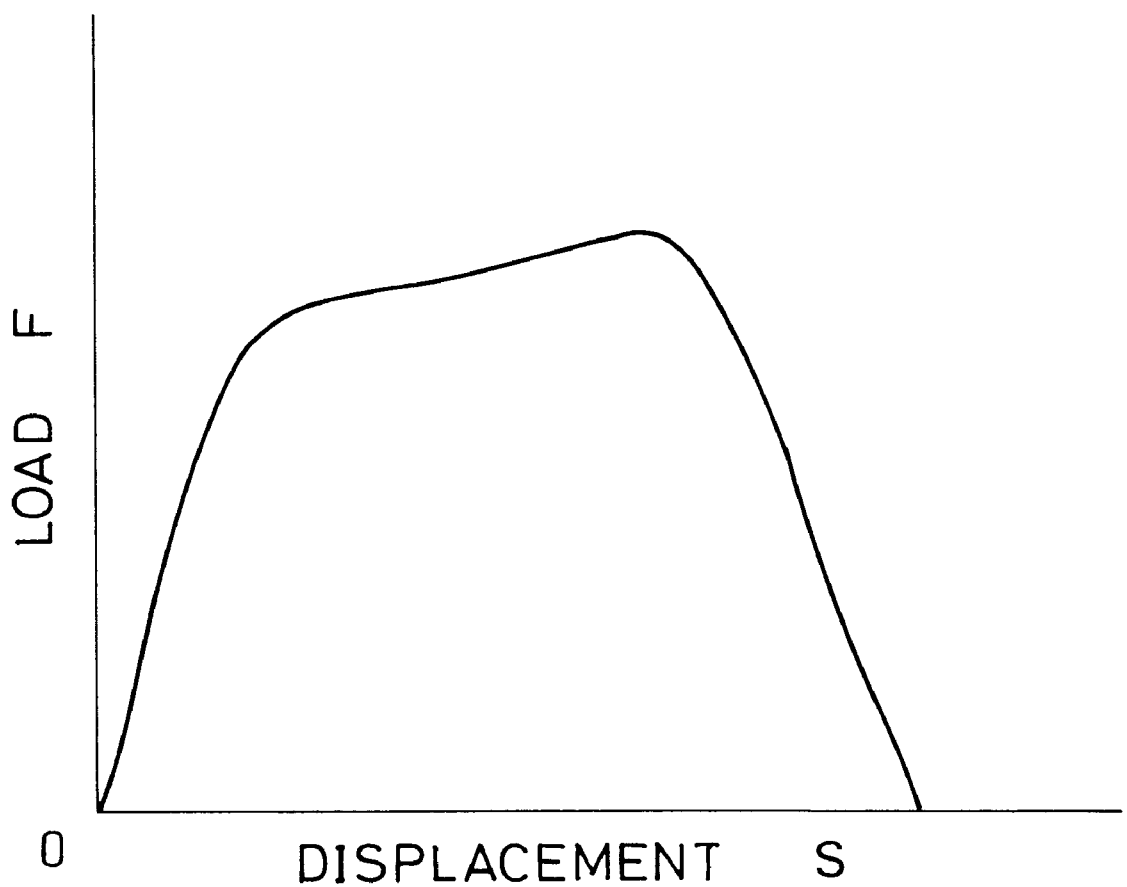
FIG. 3 is a graph of an energy absorbing characteristic qualitatively showing the relation between displacement and load.

In case of a metal plate material, as shown in FIG. 3, an energy absorbing characteristic, is shown where an initial rising of a load F is rapid relative to a displacement S. This is close to the ideal relationship, which would appears as a rectangularly-shaped line on the graph. According to the illustrated embodiment, the energy absorbing characteristic of FIG. 3 can be obtained respectively by the energy absorbing panel 26 and the energy absorbing material 50, resulting in an enlarged energy absorbing area having this energy absorbing characteristic.

Figure 2:
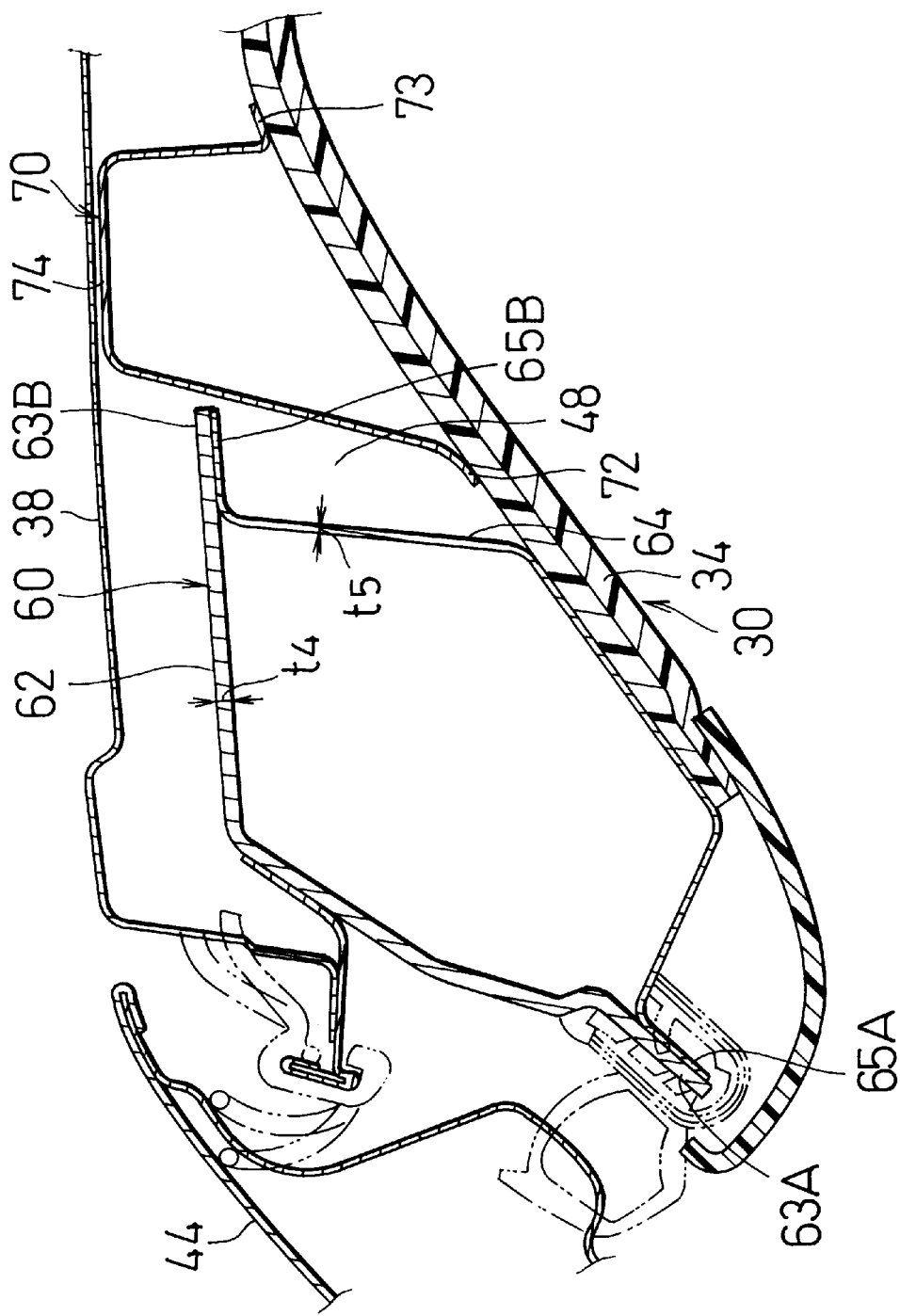
FIG. 2 is a sectional view similar to FIG. 1 of another embodiment of the same structure.

The passenger protecting structure shown in FIG. 2 is to protect a passenger by a vehicle body upper portion of an automobile having a roofside rail 60. The roofside rail 60 includes an outer panel 62, and an inner panel 64 having a thickness $t_5$ smaller than the thickness $t_4$ of the outer panel 62 so as to be capable of absorbing energy, the inner panel 64 being disposed with a space from the outer panel 62 inwardly thereof. The confronting ones of flanges 63A, 63B of the outer panel 62 and flanges 65A, 65B of the inner panel 64 are overlapped and spot-welded, so that a section cut at a vertical imaginary plane of the roofside rail 60 is formed to present a closed structure. In the illustrated embodiment the thickness of the inner panel 64 is 0.6 mm. The interior trim material 30, the roof panel 38 and the like of FIG. 2 have the same structure as that shown in FIG. 1.

The space 48 is formed between the interior trim material 30 and the roof panel 38, and an energy absorbing material 70 is disposed in the space 48 along the roofside rail 60 to extend in the longitudinal direction of the vehicle body. The energy absorbing material 70 is not required to extend over the whole length of the roofside rail 60, and it is sufficient to extend within a range where the head of a passenger is likely to collide. In the illustrated embodiment, the energy absorbing material 70 is made of a steel plate capable of absorbing energy having the same thickness as that of the inner panel 64. The energy absorbing material 70 has integrally a pair of flange portions 72, 73 spaced apart in the lateral direction of the vehicle body at a section cut at a vertical imaginary plane, and a space forming portion 74 rising from the flange portions 72, 73 outwardly thereof and is formed into a hat-like shape. The pair of flange portions 72, 73 are adhered to the roof liner 34. The function of the energy absorbing material 70 is substantially the same as that of the energy absorbing material 50 shown in FIG. 1.

What is claimed is:

1. A passenger protecting structure of a vehicle body upper portion of an automobile having a structural member disposed inwardly of a roof panel and extending in one of longitudinal and lateral directions of the vehicle body, and an interior trim material disposed inwardly of the structural member, resulting in a space between said roof panel and said interior trim material, comprising:

energy absorbing means provided in said structural member and made of a metal panel;

an energy absorbing material disposed along said structural member in said space between said roof panel and said interior trim material; and another energy absorbing material disposed between said energy absorbing means and said energy absorbing material.

2. A passenger protecting structure according to claim 1, wherein said structural member includes a flange joint portion extending toward and spaced from said energy absorbing material, and wherein said another energy absorbing material is disposed below said flange joint portion and fixed on said interior trim material.

3. A passenger protecting structure according to claim 1, wherein said energy absorbing material is made of a metal panel and has a pair of flange portions spaced apart in the direction orthogonal to said one direction of the vehicle body and a space forming portion rising from said pair of flange portions, and wherein said metal panel of said energy absorbing means has a pair of flange portions spaced apart in the same direction as that of said flange portions of said energy absorbing material and a space forming portion rising from said pair of flange portions inwardly thereof.

4. A passenger protecting structure according to claim 3, wherein said structural member has an inner panel, and wherein the thickness of said metal panel of said energy absorbing means and the thickness of said metal panel of said energy absorbing material are respectively smaller than that of said inner panel of the structural member.

5. A passenger protecting structure according to claim 4, wherein the thickness of said metal panel of said energy absorbing means and the thickness of said metal panel of said energy absorbing material are from about 0.8 to 0.4 mm.

6. A passenger protecting structure according to claim 1, wherein said energy absorbing material is made of a metal panel and has integrally a pair of flange portions spaced apart in the direction orthogonal to said one direction of the vehicle body at a section cut at a vertical imaginary plane, and a space forming portion rising from said pair of flange portions inwardly thereof, said pair of flange portions being fixed on said roof panel.

7. A passenger protecting structure according to claim 6, wherein said energy absorbing material is disposed in said space above said structural member.

8. A passenger protecting structure of a vehicle body upper portion of an automobile having a roof side rail disposed inwardly of a roof panel and extending in the longitudinal direction of the vehicle body, and an interior trim material disposed inwardly of the roof side rail, resulting in a space between said roof panel and said interior trim material, comprising:

energy absorbing means provided in said roof side rail so as to face to said interior trim material; and an energy absorbing material capable of deforming by means of a predetermined load applied from a passenger, said energy absorbing material being disposed inwardly of the lateral direction of said roof side rail or in one of the right and left hands of said roof side rail in said space between said roof panel and said interior trim material, said energy absorbing material extending in the longitudinal direction of the vehicle body within a range where the load from the passenger is likely to be applied, wherein said energy absorbing material is fixed on said roof panel, and wherein said energy absorbing material is made of a metal panel and has a pair of flange portions spaced apart in the direction orthogonal to the direction of said energy absorbing material and a space forming portion rising from said pair of flange portions, said pair of flange portions being fixed to said roof panel.

9. A passenger protecting structure of a vehicle body upper portion of an automobile having a roof side rail disposed inwardly of a roof panel and extending in the longitudinal direction of the vehicle body, and an interior trim material disposed inwardly of the roof side rail, resulting in a space between said roof panel and said interior trim material, comprising:

energy absorbing means provided in said roof side rail so as to face to said interior trim material; and an energy absorbing material capable of deforming by means of a predetermined load applied from a passenger, said energy absorbing material being disposed inwardly of the lateral direction of said roof side rail or in one of the right and left hands of said roof side rail in said space between said roof panel and said interior trim material, said energy absorbing material extending in the longitudinal direction of the vehicle body within a range where the load from the passenger is likely to be applied, wherein said energy absorbing material is fixed on said interior trim material, and wherein said energy absorbing material is made of a metal panel and has a pair of flange portions spaced apart in the direction orthogonal to the direction of said energy absorbing material and a space forming portion rising from said pair of flange portions, said pair of flange portions being fixed to said interior trim material.

10. A passenger protecting structure of a vehicle body upper portion of an automobile having a roof side rail disposed inwardly of a roof panel and extending in the longitudinal direction of the vehicle body, and an interior trim material disposed inwardly of the roof side rail, resulting in a space between said roof panel and said interior trim material, comprising:

energy absorbing means provided in said roof side rail so as to face to said interior trim material; and an energy absorbing material capable of deforming by means of a predetermined load applied from a passenger, said energy absorbing material being disposed inwardly of the lateral direction of said roof side rail or in one of the right and left hands of said roof side rail in said space between said roof panel and said interior trim material, said energy absorbing material extending in the longitudinal direction of the vehicle body within a range where the load from the passenger is likely to be applied, wherein one of said roof side rail and header is provided with a flange joint portion extending toward and spaced from said energy absorbing material, further comprising another energy absorbing material disposed below said flange joint portion between said energy absorbing means and said energy absorbing material.

11. A passenger protecting structure according to claim 10, wherein said another energy absorbing material is fixed on said interior trim material.

12. A passenger protecting structure of a vehicle body upper portion of an automobile having a structural member disposed inwardly of a roof panel and extending in one of longitudinal and lateral directions of the vehicle body, and an interior trim material disposed inwardly of the structural member, resulting in a space between said roof panel and said interior trim material, comprising:

a first energy absorber provided in said structural member and made of a metal panel;

a second energy absorber disposed along said structural member in said space between said roof panel and said interior trim material; and a third energy absorber disposed between said first energy absorber and said second energy absorber.

13. A passenger protecting structure according to claim 12, wherein said structural member includes a flange joint portion extending toward and spaced from said second energy absorber, and wherein said third energy absorber is disposed below said flange joint portion and fixed on said interior trim material.

14. A passenger protecting structure according to claim 12, wherein said second energy absorber is made of a metal panel and has a pair of flange portions spaced apart in the direction orthogonal to said one direction of the vehicle body and a space forming portion rising from said pair of flange portions, and wherein said metal panel of said first energy absorber has a pair of flange portions spaced apart in the same direction as that of said flange portions of said second energy absorber and a space forming portion rising from said pair of flange portions inwardly thereof.

15. A passenger protecting structure according to claim 14, wherein said structural member has an inner panel, and wherein the thickness of said metal panel of said first energy absorber and the thickness of said metal panel of said second energy absorber are respectively smaller than that of said inner panel of the structural member.

16. A passenger protecting structure according to claim 15, wherein the thickness of said metal panel of said first energy absorber and the thickness of said metal panel of said second energy absorber are from about 0.8 to 0.4 mm.

17. A passenger protecting structure according to claim 12, wherein said second energy absorber is made of a metal panel and has integrally a pair of flange portions spaced apart in the direction orthogonal to said one direction of the vehicle body at a section cut at a vertical imaginary plane, and a space forming portion rising from said pair of flange portions inwardly thereof, said pair of flange portions being fixed on said roof panel.

18. A passenger protecting structure according to claim 17, wherein said second energy absorber is disposed in said space above said structural member.

19. A passenger protecting structure of a vehicle body upper portion of an automobile having a roof side rail disposed inwardly of a roof panel and extending in the longitudinal direction of the vehicle body, and an interior trim material disposed inwardly of the roof side rail, resulting in a space between said roof panel and said interior trim material, comprising:

a first energy absorber provided in said roof side rail so as to face to said interior trim material; and a second energy absorber capable of deforming by means of a predetermined load applied from a passenger, said second energy absorber being disposed inwardly of the lateral direction of said roof side rail or in one of the right and left hands of said roof side rail in said space between said roof panel and said interior trim material, said second energy absorber extending in the longitudinal direction of the vehicle body within a range where the load from the passenger is likely to be applied, wherein said second energy absorber is fixed on said roof panel, and wherein said second energy absorber is made of a metal panel and has a pair of flange portions spaced apart in the direction orthogonal to the direction of said second energy absorber and a space forming portion rising from said pair of flange portions, said pair of flange portions being fixed to said roof panel.

20. A passenger protecting structure of a vehicle body upper portion of an automobile having a roof side rail disposed inwardly of a roof panel and extending in the longitudinal direction of the vehicle body, and an interior trim material disposed inwardly of the roof side rail, resulting in a space between said roof panel and said interior trim material, comprising:

a first energy absorber provided in said roof side rail so as to face to said interior trim material; and a second energy absorber capable of deforming by means of a predetermined load applied from a passenger, said second energy absorber being disposed inwardly of the lateral direction of said roof side rail or in one of the right and left hands of said roof side rail in said space between said roof panel and said interior trim material, said second energy absorber extending in the longitudinal direction of the vehicle body within a range where the load from the passenger is likely to be applied, wherein said second energy absorber is fixed on said interior trim material, and wherein said second energy absorber is made of a metal panel and has a pair of flange portions spaced apart in the direction orthogonal to the direction of said second energy absorber and a space forming portion rising from said pair of flange portions, said pair of flange portions being fixed to said interior trim material.

21. A passenger protecting structure of a vehicle body upper portion of an automobile having a roof side rail disposed inwardly of a roof panel and extending in the longitudinal direction of the vehicle body, and an interior trim material disposed inwardly of the roof side rail, resulting in a space between said roof panel and said interior trim material, comprising:

a first energy absorber provided in said roof side rail so as to face to said interior trim material; and a second energy absorber capable of deforming by means of a predetermined load applied from a passenger, said second energy absorber being disposed inwardly of the lateral direction of said roof side rail or in one of the right and left hands of said roof side rail in said space between said roof panel and said interior trim material, said second energy absorber extending in the longitudinal direction of the vehicle body within a range where the load from the passenger is likely to be applied, wherein one of said roof side rail and header is provided with a flange joint portion extending toward and spaced from said second energy absorber, further comprising a third energy absorber disposed below said flange joint portion between said first energy absorber and said second energy absorber.

22. A passenger protecting structure according to claim 21, wherein said third energy absorber is fixed on said interior trim material.

23. A passenger protecting structure of a vehicle body upper portion of an automobile having a header disposed inwardly of a roof panel and extending in the lateral direction of the vehicle body, and an interior trim material disposed inwardly of the header, resulting in a space between said roof panel and said interior trim material, comprising:

energy absorbing means provided in said header so as to face to said interior trim material; and an energy absorbing material capable of deforming by means of a predetermined load applied from a passenger, said energy absorbing material being disposed backward of said header in said space between said roof panel and said interior trim material, said energy absorbing material extending in the lateral direction of the vehicle body within a range where the load from the passenger is likely to be applied, wherein said energy absorbing material is fixed on said roof panel, and wherein said energy absorbing material is made of a metal panel and has a pair of flange portions spaced apart in the direction orthogonal to the direction of said energy absorbing material and a space forming portion rising from said pair of flange portions, said pair of flange portions being fixed to said roof panel.

24. A passenger protecting structure of a vehicle body upper portion of an automobile having a header disposed inwardly of a roof panel and extending in the lateral direction of the vehicle body, and an interior trim material disposed inwardly of the header, resulting in a space between said roof panel and said interior trim material, comprising:

energy absorbing means provided in said header so as to face to said interior trim material; and an energy absorbing material capable of deforming by means of a predetermined load applied from a passenger, said energy absorbing material being disposed backward of said header in said space between said roof panel and said interior trim material, said energy absorbing material extending in the lateral direction of the vehicle body within a range where the load from the passenger is likely to be applied, wherein said energy absorbing material is fixed on said interior trim material, and wherein said energy absorbing material is made of a metal panel and has a pair of flange portions spaced apart in the direction orthogonal to the direction of said energy absorbing material and a space forming portion rising from said pair of flange portions, said pair of flange portions being fixed to said interior trim material.

25. A passenger protecting structure of a vehicle body upper portion of an automobile having a header disposed inwardly of a roof panel and extending in the lateral direction of the vehicle body, and an interior trim material disposed inwardly of the header, resulting in a space between said roof panel and said interior trim material, comprising:

energy absorbing means provided in said header so as to face to said interior trim material; and an energy absorbing material capable of deforming by means of a predetermined load applied from a passenger, said energy absorbing material being disposed backward of said header in said space between said roof panel and said interior trim material, said energy absorbing material extending in the lateral direction of the vehicle body within a range where the load from the passenger is likely to be applied, wherein one of said roof side rail and header is provided with a flange joint portion extending toward and spaced from said energy absorbing material, further comprising another energy absorbing material disposed below said flange joint portion between said energy absorbing means and said energy absorbing material.

26. A passenger protecting structure according to claim 25, wherein said another energy absorbing material is fixed on said interior trim material.

27. A passenger protecting structure of a vehicle body upper portion of an automobile having a header disposed inwardly of a roof panel and extending in the lateral direction of the vehicle body, and an interior trim material disposed inwardly of the header, resulting in a space between said roof panel and said interior trim material, comprising:

a first energy absorber provided in said header so as to face to said interior trim material; and a second energy absorber capable of deforming by means of a predetermined load applied from a passenger, said second energy absorber being disposed backward of said header in said space between said roof panel and said interior trim material, said second energy absorber extending in the lateral direction of the vehicle body within a range where the load from the passenger is likely to be applied, wherein said second energy absorber is fixed on said roof panel, and wherein said second energy absorber is made of a metal panel and has a pair of flange portions spaced apart in the direction orthogonal to the direction of said second energy absorber and a space forming portion rising from said pair of flange portions, said pair of flange portions being fixed to said roof panel.

28. A passenger protecting structure of a vehicle body upper portion of an automobile having a header disposed inwardly of a roof panel and extending in the lateral direction of the vehicle body, and an interior trim material disposed inwardly of the header, resulting in a space between said roof panel and said interior trim material, comprising:

a first energy absorber provided in said header so as to face to said interior trim material; and a second energy absorber capable of deforming by means of a predetermined load applied from a passenger, said second energy absorber being disposed backward of said header in said space between said roof panel and said interior trim material, said second energy absorber extending in the lateral direction of the vehicle body within a range where the load from the passenger is likely to be applied, wherein said second energy absorber is fixed on said interior trim material, and wherein said second energy absorber is made of a metal panel and has a pair of flange portions spaced apart in the direction orthogonal to the direction of said second energy absorber and a space forming portion rising from said pair of flange portions, said pair of flange portions being fixed to said interior trim material.

29. A passenger protecting structure of a vehicle body upper portion of an automobile having a header disposed inwardly of a roof panel and extending in the lateral direction of the vehicle body, and an interior trim material disposed inwardly of the header, resulting in a space between said roof panel and said interior trim material, comprising:

a first energy absorber provided in said header so as to face to said interior trim material; and a second energy absorber capable of deforming by means of a predetermined load applied from a passenger, said second energy absorber being disposed backward of said header in said space between said roof panel and said interior trim material, said second energy absorber extending in the lateral direction of the vehicle body within a range where the load from the passenger is likely to be applied, wherein one of said roof side rail and header is provided with a flange joint portion extending toward and spaced from said second energy absorber, further comprising a third energy absorber disposed below said flange joint portion between said first energy absorber and said second energy absorber.

30. A passenger protecting structure according to claim 29, wherein said third energy absorber is fixed on said interior trim material.

* * * * *